United States Patent [19]
Lewis

[11] Patent Number: 5,438,312
[45] Date of Patent: Aug. 1, 1995

[54] ANTI-LOCKOUT SYSTEM

[76] Inventor: James Lewis, 615 W. Chilton St., Chandler, Ariz. 85224

[21] Appl. No.: 229,750

[22] Filed: Apr. 19, 1994

[51] Int. Cl.$^6$ ................................................. B60Q 1/00
[52] U.S. Cl. ........................... 340/457; 340/457.1; 340/542; 340/539; 307/10.1; 70/263
[58] Field of Search ............. 340/457, 539, 457.1, 340/542, 522; 307/9.1, 10.1; 70/57, 262, 263, 264, DIG. 49

[56] References Cited

U.S. PATENT DOCUMENTS

| | | | |
|---|---|---|---|
| 4,096,468 | 6/1978 | Kopera, Jr. | 340/457.1 |
| 4,419,712 | 12/1983 | Shimizu | 361/172 |
| 4,428,024 | 1/1984 | Mochida et al. | 361/172 |
| 4,672,375 | 6/1987 | Mochida et al. | 340/825.31 |
| 4,709,777 | 12/1987 | Metz | 180/286 |
| 4,789,851 | 12/1988 | Hock et al. | 340/52 D |
| 4,811,013 | 3/1989 | Akutsu | 340/825.31 |

Primary Examiner—Donnie L. Crosland
Attorney, Agent, or Firm—Sandra L. Etherton

[57] ABSTRACT

An electronic system for preventing keys from being locked inside a vehicle. An ignition or door key houses a wireless transmitter which can send a signal to lock or unlock the vehicle doors. As a driver approaches a locked car, the unlock button on the transmitter is pressed, thereby unlocking the doors. Upon exiting the vehicle, a driver may inadvertently lock himself out of the vehicle if the doors are manually locked when the door key is inadvertently left somewhere inside the car. To prevent lock-out, an oscillating unlock signal is automatically sent from the transmitter to the electronic door locks. Simultaneously an alarm sounds to alert the driver that the keys are still in the car. The driver returns to the vehicle, opens the doors which have been automatically unlocked, and retrieves the keys. Upon retrieval of the keys, the driver again exits the vehicle, locks the doors manually or electronically, and presses the lock button to stop the alarm and end the transmission of the oscillating unlock signal.

13 Claims, 5 Drawing Sheets

ANTI-LOCKOUT SYSTEM

BACKGROUND OF THE INVENTION

This invention relates generally to a system that prevents keys from inadvertently being locked in a vehicle. More particularly this invention relates to an electronic system in which an alarm sounds and vehicle doors automatically unlock when the keys have been left anywhere inside the vehicle.

To the chagrin of automobile drivers, it is easy to lock ignition and door keys in a vehicle, thus locking the driver out. This occurs when the driver leaves the keys in the car, exits the car, and locks the doors without a key by manually manipulating the latch or electronically engaging the locks. While most drivers find this embarrassing and annoying, locking the keys in the car can also be dangerous if a small child or animal is locked inside.

For safety reasons, young children are often strapped into a safety seat for travel. It is likely that the child does not know how to unlatch the safety seat belts or is not dexterous enough to do it. Similarly such a child may not be able to unlock a car door from the inside, even if not strapped into a safety seat. If a driver inadvertently locks the car keys in the car while the child is inside, a precarious situation arises. The child can't get out and the driver can't get in.

As is often the case, drivers with small children may drive a van or station wagon. A common scene is to finish shopping and return to the car with groceries and a child. Before loading the groceries, the passenger compartment is unlocked with the keys and the child is placed in the car seat. The driver then goes to the trunk or rear of the van to load the groceries. The rear door is opened and because the driver wants to use two hands to load, the car keys are set down in the car. After the groceries are loaded, the driver slams the trunk or door tightly for security, locking the door by habit, only to realize in horror that the groceries, child and keys are now securely locked in the car.

A similar situation may arise if an animal is in the car when the driver exits the vehicle and inadvertently locks the keys in the car. Moreover, even if the driver leaves the doors unlocked, an active animal may inadvertently lock the doors by stepping on the door lock button or plunger, thereby locking itself in the car.

Aside from the embarrassment to the driver, and the subsequent expense and wasted time to call for police or a locksmith to unlock the door, the safety of the child or animal can become of great concern. If the vehicle is turned off, as is normally the case when keys are locked in the car, the interior environment of the vehicle is not controlled. In desert areas, the interior temperature of a closed vehicle can reach 140 degrees in a matter of minutes. Likewise in cold areas, the interior temperature can drop to sub-freezing temperatures in a very short time. These temperature extremes can be life-threatening to humans and animals locked in the car.

The prior art has endeavored to create devices which prevent car keys from being locked in a car, generally known as anti-lockout devices. However, these devices were not created to prevent life-threatening conditions to vehicle occupants. Instead they were developed to alert the driver that the ignition keys were still in the ignition upon the driver's exit and, if not retrieved, to disable the locking mechanisms. U.S. Pat. Nos. 4,709,777, 4,789,851, 4,428,024 and 4,419,712 describe variations on an electronic door lock interlock which senses the presence of a key in the ignition. When the key is in the ignition and the driver attempts to lock the doors, an alarm sounds and the locking mechanism is disabled. These devices work as anti-lockout devices only if the key has been left in the ignition. A driver would be locked out if the keys were left anywhere else in the car but the ignition, like the floor, on the seat, or in the trunk.

Instead of unlocking the car doors automatically when the keys have been left inside, other prior art inventions for keyless entry systems automatically lock the doors to prevent theft of the vehicle or its contents. These devices do not prevent or solve the situation where a child is locked in a car and, in fact, aggravate it. Keyless entry systems do not require keys to operate door locks, and use remote control technology to electronically operate door locks and the like. Instead of a key to insert in a mechanical lock, the driver carries a transmitter to signal the locks to engage electronically. Anti-lockout devices have been designed into this wireless technology so that if a transmitter is locked in the car, the driver may still enter with a key or by entering a preset code. For example, U.S. Pat. No. 4,672,375 describes a keyless entry system that alerts the driver if the transmitter has been left in the car. If the driver does not retrieve the transmitter, the doors automatically lock, the keyless entry system is disabled, and the car can be entered only with a key.

Anti-lock devices are well known in the prior art. However, until now, these devices served to alert the driver only if the key has been left in the ignition. If the keys are removed from the ignition, but still left somewhere in the car, the prior art devices are ineffective. Therefore, it is an object of this invention to overcome the problems of prior art and provide an anti-lockout system which will prevent the doors from locking if the keys have been left in the car, regardless of their location within the car. It is a further object of this invention to enable a driver to re-enter the car to retrieve the car keys if they have been left in the car. It is a further object of this invention to provide a system which will alert the driver that the keys have been left in the car so that the keys can be retrieved and the doors locked.

BRIEF SUMMARY OF THE INVENTION

This patent discloses an electronic system for preventing keys from being locked inside a vehicle. A vehicle key houses a wireless transmitter which can send a signal to lock or unlock the vehicle doors. To enter a car normally, a driver approaches a locked car and presses the unlock button on the transmitter, which in turn unlocks the doors. To exit a car normally, the driver exits the car with keys in hand, and locks the doors by transmitting a lock signal or otherwise engaging the locks.

However, a driver may inadvertently lock himself out of the vehicle if he exits and locks the doors manually when the key is inadvertently left somewhere inside the car. To prevent lock-out in such a situation, an oscillating unlock signal is automatically sent from the transmitter to the electronic door locks as soon as the driver's seat belt is unbuckled. After a few seconds delay, if the lock button on the transmitter is not pressed, an alarm sounds to alert the driver that the keys are still in the car. The driver may then return to the vehicle, open the doors which have automatically been kept unlocked, and retrieve the keys. Upon retrieval of the keys, the driver again exits the vehicle, locks the doors manually or electronically, and presses the lock button to stop the alarm and end the transmission of the oscillating unlock signal. The car is secured and the driver has the keys in hand. To save the battery life of the transmitter, the oscillating unlock signal can also be turned off by inserting the key in the ignition.

DESCRIPTION OF THE PREFERRED EMBODIMENTS

Figure 1:
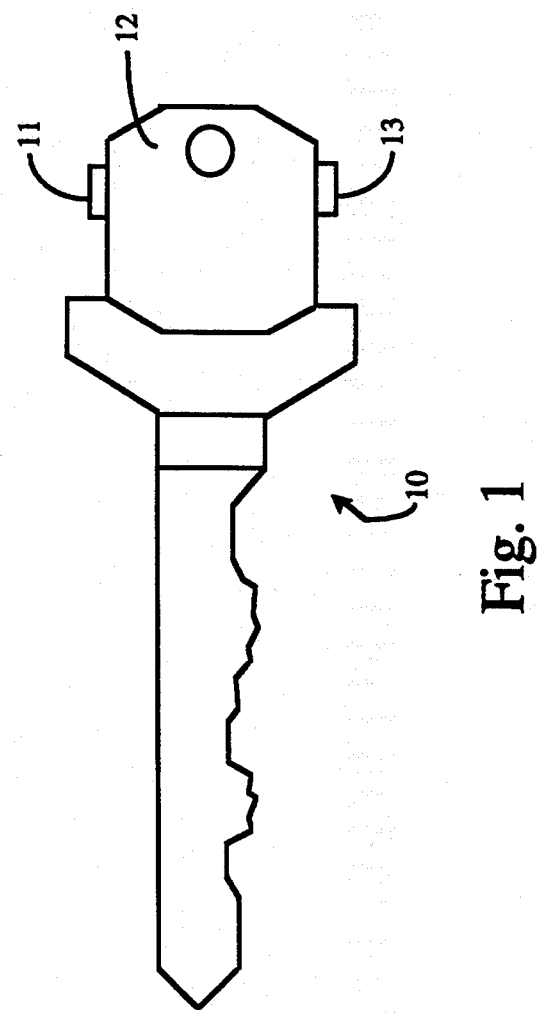
FIG. 1 is an illustration of the key housing the lock-/unlock transmitter.
Figure 2:
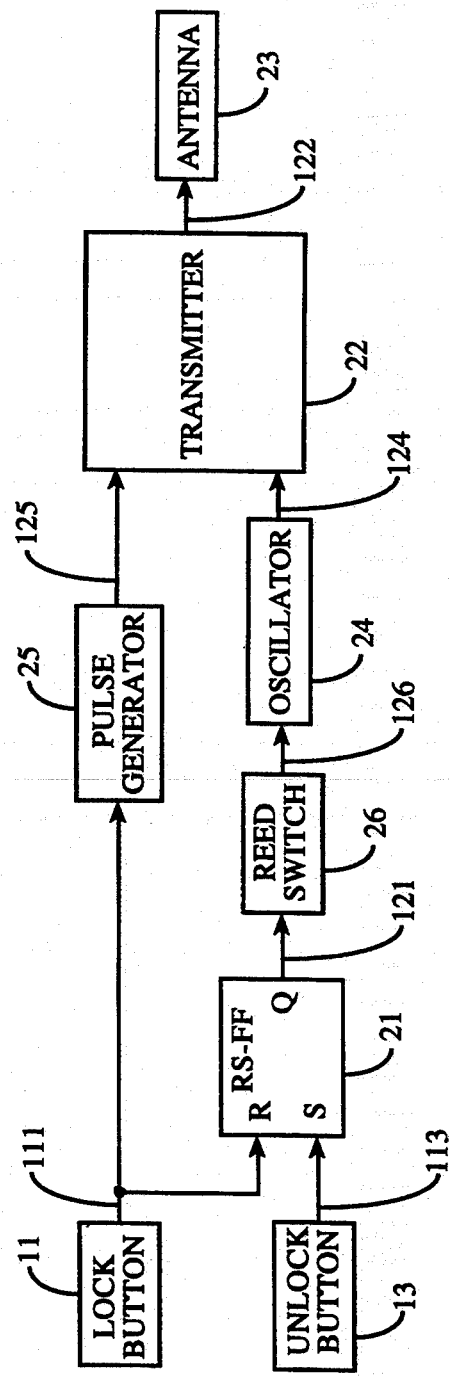
FIG. 2 is a block diagram showing the general circuit arrangement of the key transmitter.

Referring now to the accompanying drawings, FIG. 1 and 2 illustrate the key transmitter. Preferably the transmitting/receiving process is based on standard radio frequency remote control technology, commonly known in the prior art, with improvements that implement the invention. FIG. 1 illustrates a key 10 housing the lock/unlock transmitter for the present invention. A lock button 11 on the head 12 of the key 10 is depressed to transmit a signal to a remote receiver to lock the doors. An unlock button 13 is depressed to transmit a signal to the remote receiver to unlock the doors.

Alternatively, the transmitter can be housed in a key holder separate from the head of the key, but still attached to it. U.S. Pat. No. 5,220,319 describes such a key holder for a remote control transmitter. If using this alternative embodiment, however, inserting the key into the ignition will not terminate the oscillating unlock signal. Instead, the unlock signal transmission will continue, running off the battery until the lock button is again depressed. This will tend to run the battery down sooner than if the transmitter circuitry is housed in the head of the key.

The circuitry necessary to carry out the transmission is illustrated in FIG. 2. Discrete circuits may be used, but it would be advantageous to add the necessary circuitry to an existing microcontroller or application specific integrated circuit (ASIC), as the transmitter housing should be quite small. Other possible embodiments of the transmission circuitry such as a programmable logic device (PLD) or a field programmable gate array (FPGA) would be recognized by those skilled in the art. The transmission is powered by a battery, preferably a lithium or Ni-Cad battery, known for their small size and long life.

A latch or memory unit 21 connects the lock 11 and unlock 13 buttons to the transmitter 22. When the lock button 11 is depressed, the transmitter 22 generates a radio frequency lock signal 122 that the antenna 23 emits. The duration of the radio frequency lock signal 122 is determined by the lock signal 125. The duration of the lock signal 125 is as long as the time the lock button 11 is depressed. Alternatively, it can be of uniform duration by using a pulse generator 25 triggered by the lock button 11, as shown in FIG. 2. The latch 21 shown in FIG. 2 is preferably a reset-set flip-flop (referred to as RS-FF), but those skilled in the art will recognize other embodiments for it, such as an SC, D- or JK flip-flop, a register in a microprocessor, or logic gates. The state 121 of the latch 21 is determined by the lock 111 and unlock 113 signals. The latch 21 becomes active when the unlock button 13 is depressed and remains active until the lock button 11 is depressed.

Interposed between the latch 21 and the transmitter 22 is a reed switch 26 and an oscillator 24. The reed switch 26, normally closed, deactivates the continuous unlock signal when the reed switch is open. The oscillator 24 generates a duty cycle 124 of a short period "on" and longer period "off" when it receives a constant unlock signal 126. Preferably, the cycle consists of sending approximately a two-second unlock signal followed by a period of approximately ten seconds where no signal is generated. The transmitter 22 outputs a radio frequency unlock signal 122 to the antenna 23 when the period "on" of the duty cycle 124 is received.

Figure 3:
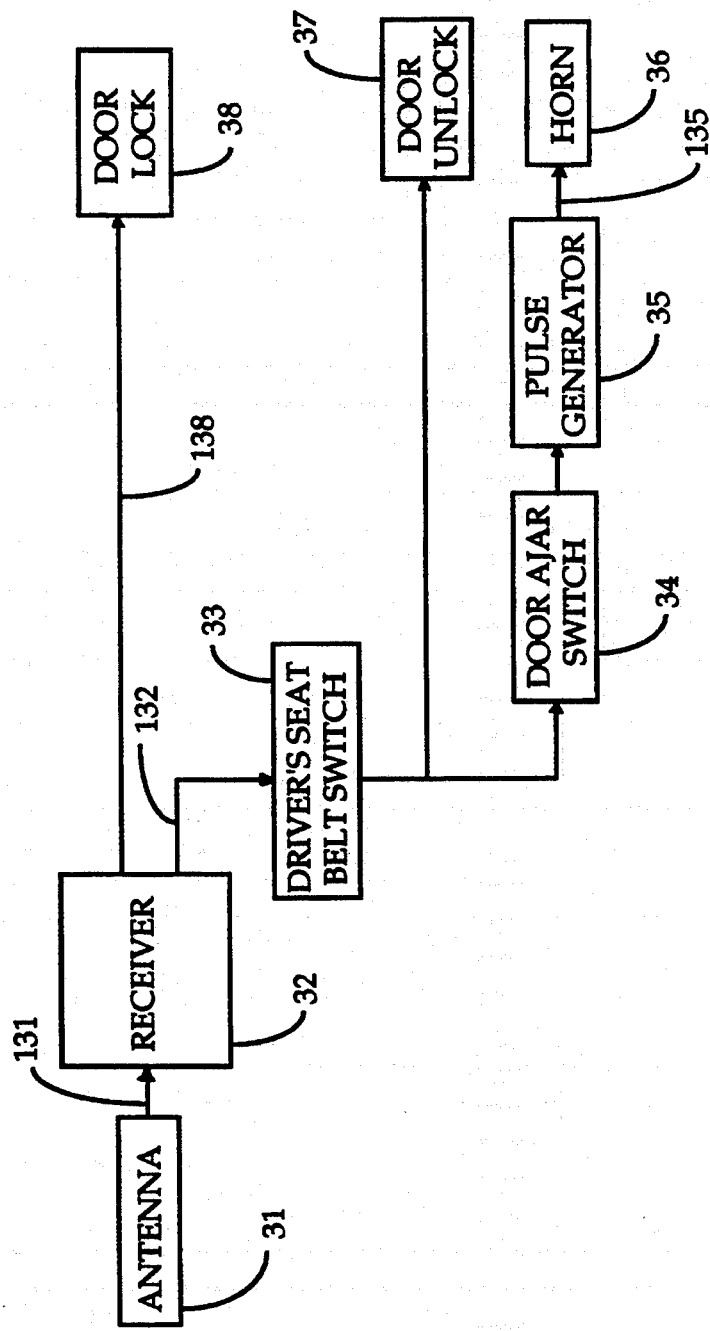
FIG. 3 is a block diagram showing the general circuit arrangement of the vehicle-mounted receiver.

FIG. 3 shows the general circuit arrangement of the preferred embodiment of the vehicle-mounted section of the present invention. The circuitry is based on standard remote control and electronic door lock technology, known commercially, with improvements that implement the invention. The receiver 32 receives a radio frequency signal 131, either lock or unlock, from an antenna 31 and outputs a non-oscillating lock 138 or an oscillating unlock 132 signal, respectively. A standard door lock mechanism 38 is activated when a non-oscillating lock signal 138 is generated. When an oscillating unlock signal 132 is generated, the driver's presence in the car is tested via a driver's seat belt switch 33. Preferably, when the seat belt is buckled (indicating the driver's presence in the car), a driver's seat belt switch 33 is open and the oscillating unlock signal 132 is inhibited. However, if the seat belt is unbuckled, the driver's seat belt switch 33 is closed and the oscillating unlock signal 132 activates a standard door unlock mechanism 37 and the vehicle horn 36 or other audible alarm mechanism.

Preferably, a door ajar switch 34 and a pulse generator 35 are interposed between the driver's seat belt switch 33 and the horn 36. The door ajar switch 34 allows the driver to unlock the vehicle and open the door (e.g. while loading groceries in the vehicle) without sounding the horn 36. If desired, the pulse generator 35 may be used to allow a pulsed warning signal 135 length to be adjusted independent of the oscillating unlock signal length (which is equal to the duty cycle period "on").

Figure 4:
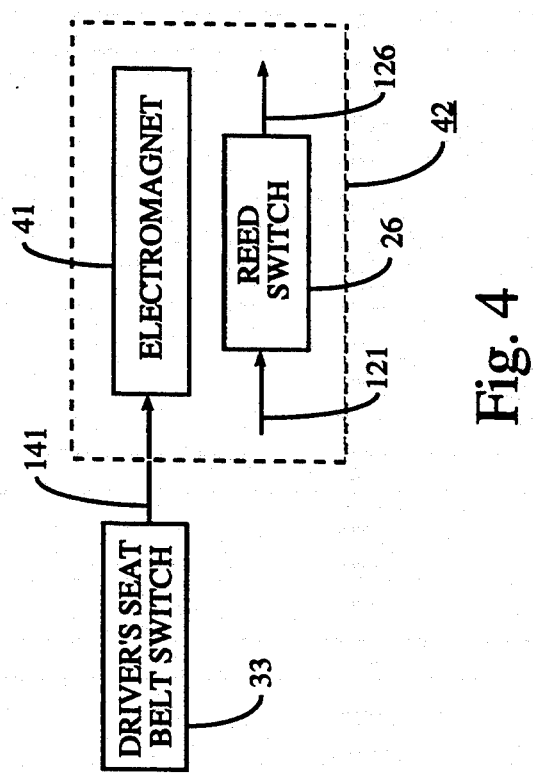
FIG. 4 is a block diagram showing the general circuit arrangement of the battery-life saving feature incorporated into the vehicle ignition.

Because the oscillating unlock signal is continually transmitted unless affirmatively stopped, the battery powering the transmitter may die quickly. FIG. 4 illustrates the general circuit arrangement of the optional battery-life saving feature of the invention. An electromagnet 41 is contained within the ignition switch 42. When the driver's seat belt is buckled, the driver's seat belt switch outputs a signal 141 to activate the electromagnet 41. When the reed switch 26 in the key transmitter 10 comes in close proximity to the electromagnet 41, the switch is opened; the oscillator's 24 duty cycle is stopped and the transmitter 22 no longer outputs unlock signals. This feature increases battery life for the key transmitter 10.

Figure 5:
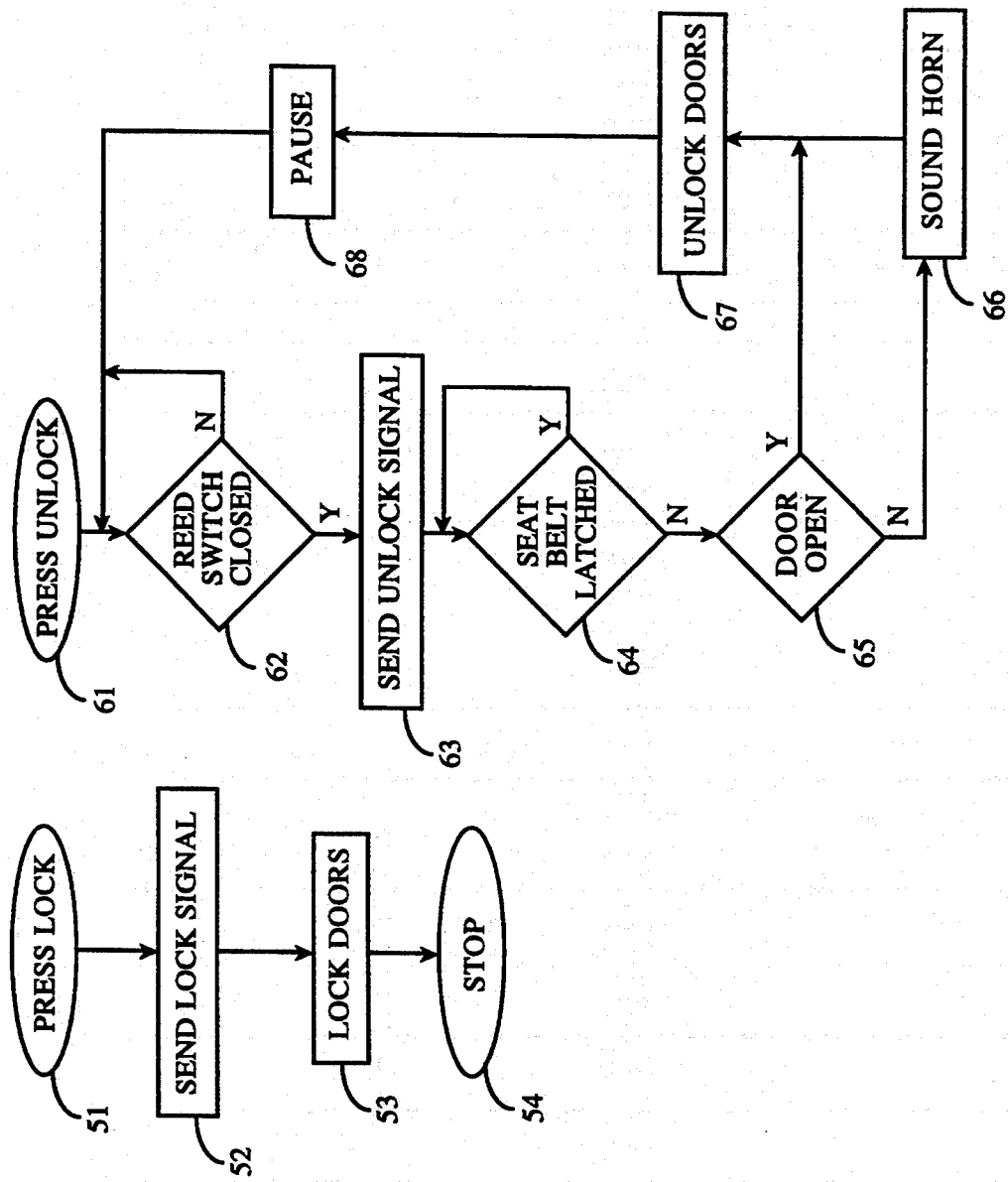
FIG. 5 is a flow chart of the present invention.

FIG. 5 illustrates the method embodied by this invention for preventing keys from being locked in a vehicle. The system is at rest 54 (in a stable state) only after the lock button has been depressed 51 and a lock doors signal 52 has been sent to the door lock mechanism 53.

When the unlock button is depressed 61, the system is in a constantly unstable state. If the key is in the ignition, the reed switch opens 62 and the system pauses when the seat belt is buckled 64. If the key is not in the ignition, an unlock signal 63 is transmitted. If the seat belt is not buckled 64 the unlock duty cycle 67, 68 will continue and if the door is closed 65 the horn will also be sounded 66. The unstable unlocked state prevents the driver from leaving the key in the vehicle and manually locking the doors, by repeatedly unlocking the doors and sounding the horn to alert the driver to retrieve the key. The unstable unlocked state distinguishes this invention from the prior art because no affirmative action such as pressing an automatic door lock button is required to alert the driver. An affirmative action (i.e. pressing the lock button 11 on the key transmitter 10) is required to prevent the system from alerting the driver. This improves safety by requiring the driver to retrieve the key from the vehicle before locking it, thus allowing the driver to always be able to unlock the vehicle when needed.

The improvements embodied by this invention relate to the process of unlocking vehicle doors. In this invention, the unlock signal sent by the transmitter is an oscillating duty cycle, whereby the doors are continually unlocked until the unlock signal is stopped by one of several actions. This process requires not only an affirmative action to lock the doors, but enables the unlock signal until it, too, is affirmatively stopped. This combination of actions prevents the keys housing the transmitter from being locked in the car. These objectives are achieved with the anti-lockout system described above and in the accompanying drawings. Variations and modifications which are in the spirit of this invention are considered to fall within the scope of this patent.

I claim:

1. A method for preventing keys from being locked in a vehicle comprising:
   transmitting a first lock signal;
   transmitting a first oscillating unlock signal;
   receiving the first lock signal and outputting a second lock signal;
   locking at least one door of a vehicle when the second lock signal is received;
   receiving the first oscillating unlock signal and outputting a second oscillating unlock signal;
   inhibiting the second oscillating unlock signal when a driver's seat belt is buckled;
   inhibiting the second oscillating unlock signal when at least one door of the vehicle is open;
   sounding an audible warning when the second oscillating unlock signal is output;
   unlocking at least one door of the vehicle when the second oscillating unlock signal is output;
   whereby at least one door of a vehicle is unlocked and the audible warning is sounded when the seat belt is unbuckled and at least one door of the vehicle is closed.

2. A method according to claim 1 wherein the transmitted first oscillating unlock signal and first lock signal are of radio frequency.

3. The method according to claim 1 wherein the audible warning is sounded after a preset delay period.

4. The method according to claim 1 wherein the audible warning is a vehicle's horn.

5. The method according to claim 1 in which the first lock signal is transmitted by depressing a lock button attached to a vehicle ignition key; and
   the first oscillating unlock signal is transmitted by depressing an unlock button attached to the vehicle ignition key.

6. The method according to claim 5 wherein the transmission of the first oscillating unlock signal is stopped by pressing the lock button attached to the vehicle ignition key.

7. The method according to claim 5 in which the first lock signal is transmitted by depressing a lock button integral with a vehicle ignition key head; and
   the first oscillating unlock signal is transmitted by depressing an unlock button integral with the vehicle ignition key head; and
   the transmission of the first oscillating unlock signal is stopped by inserting the vehicle ignition key into a vehicle ignition.

8. A method for preventing keys from being locked in a vehicle comprising:
   depressing a lock button attached to a vehicle ignition key when at least one door of a vehicle is to be locked;
   depressing an unlock button attached to the vehicle ignition key when at least one door of a vehicle is to be unlocked;
   when the unlock button is depressed, outputting a first oscillating unlock signal from an electronic circuit capable of outputting a first signal in response to an unlock signal and a second signal in response to a lock signal;
   when the lock button is depressed, outputting a first lock signal from the electronic circuit capable of outputting a first signal in response to an unlock signal and a second signal in response to a lock signal;
   outputting a second oscillating unlock signal from an oscillator connected to a reed switch when the first oscillating unlock signal is received;
   transmitting the second oscillating unlock signal and the first lock signal with a transmitter wherein the oscillator is connected to the transmitter;
   receiving the second oscillating unlock signal with a receiver when the second oscillating unlock signal is transmitted and receiving the first lock signal with a receiver when the first lock signal is transmitted;
   outputting a third oscillating unlock signal when the second oscillating unlock signal is received and outputting a non-oscillating lock signal when the first lock signal is received;
   inhibiting the third oscillating unlock signal when a driver's seat belt is buckled, a driver's seat belt switch being connected to the receiver and closed when the driver's seat belt is buckled;
   inhibiting the third oscillating unlock signal when at least one door of the vehicle is open by using a door ajar switch connected to the driver's seat belt switch;
   outputting a pulsed warning signal when the third oscillating unlock signal is received;
   sounding an audible warning when the pulsed warning signal is received;
   locking at least one door of the vehicle when the first lock signal is received;
   unlocking at least one door of the vehicle when the third oscillating unlock signal is output;

opening the reed switch when the driver's seat belt is buckled and the reed switch is in close proximity to a vehicle ignition by way of an electromagnet within an ignition switch of the vehicle connected to the driver's seat belt switch;

whereby at least one door of the vehicle is unlocked and the audible warning is sounded when a driver unbuckles the driver's seat belt and leaves the vehicle without depressing the lock button on the ignition key.

9. The method according to claim 8 wherein the transmitted second oscillating unlock signal and the first lock signal are of radio frequency.

10. The method according to claim 8 wherein the sounding of the audible alarm occurs after a preset delay period.

11. The method according to claim 8 wherein the audible alarm is a vehicle's horn.

12. The method according to claim 8 wherein the electronic circuit capable of outputting a first signal in response to a lock signal and a second signal in response to an unlock signal further comprises a latch, a set terminal of which is connected to the unlock button and a reset terminal is connected to the unlock button.

13. The method according to claim 8 wherein the non-oscillating lock signal further comprises a constant lock signal generated by a pulse generator.

* * * * *